United States Patent
Wu et al.

(10) Patent No.: US 7,593,200 B2
(45) Date of Patent: Sep. 22, 2009

(54) BUCK CONVERTER FAULT DETECTION METHOD

(75) Inventors: Wenkai Wu, East Greenwich, RI (US); George Schuellein, Narragansett, RI (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/838,339

(22) Filed: Aug. 14, 2007

(65) Prior Publication Data
US 2008/0043499 A1    Feb. 21, 2008

Related U.S. Application Data

(60) Provisional application No. 60/822,438, filed on Aug. 15, 2006.

(51) Int. Cl.
*H02H 3/00* (2006.01)
(52) U.S. Cl. ........................................ 361/42
(58) Field of Classification Search ..................... 361/42
See application file for complete search history.

(56) References Cited

U.S. PATENT DOCUMENTS

| | | | |
|---|---|---|---|
| 5,250,893 A * | 10/1993 | Gambill et al. ............ 324/115 |
| 5,847,554 A * | 12/1998 | Wilcox et al. ............... 323/282 |
| 6,381,159 B2 * | 4/2002 | Oknaian et al. .............. 363/98 |
| 2005/0179423 A1 * | 8/2005 | Xing ........................... 323/282 |
| 2005/0285580 A1 * | 12/2005 | Chen et al. .................. 323/282 |
| 2006/0055380 A1 * | 3/2006 | Galvano et al. ............. 323/217 |
| 2006/0113664 A1 * | 6/2006 | Shiraishi et al. ............. 257/723 |
| 2006/0170405 A1 * | 8/2006 | Hasegawa ................... 323/283 |

* cited by examiner

*Primary Examiner*—Stephen W Jackson
*Assistant Examiner*—Ann T Hoang
(74) *Attorney, Agent, or Firm*—Farajami & Farajami LLP

(57) ABSTRACT

A circuit for detecting faults in a converter, the converter including a switching stage having high- and low-side series switches connected together at a switching node and fault circuitry for managing a plurality of fault conditions, an input voltage source being provided at one terminal of the high-side switch. The circuit including a gate driver circuit connected to gate terminals of the high- and low-side switches for providing PWM signals to control the switching stage; a comparator circuit for comparing a voltage at the switching node to the input voltage and providing an output signal, the comparator circuit having output, positive and negative terminals; a capacitor connected to the output terminal of the comparator circuit to generate an AC component of the comparator circuit output signal; and a rectifier circuit connected to the capacitor for rectifying the AC component of the comparator circuit output signal and providing a fault-indicating signal to the gate driver circuit. The fault-indicating signal is used to drive the fault circuitry to correct a fault condition selected from the plurality of fault conditions in the converter system.

7 Claims, 2 Drawing Sheets

BUCK CONVERTER FAULT DETECTION METHOD

CROSS-REFERENCE TO RELATED APPLICATION

This application is based on and claims priority to U.S. Provisional Patent Application Ser. No. 60/822,438, filed on Aug. 15, 2006 and entitled BUCK CONVERTER FAULT DETECTION METHOD, the entire disclosure of which is hereby incorporated by reference.

BACKGROUND OF THE INVENTION

The present invention relates to converters, and more particularly to detecting fault in converters.

In a single or scalable buck converter system, each buck converter might experience faults such as input rail floating, high side switch gate floating, high side switch short or open, etc. Such faults might lead other converters to become electrically or thermally overstressed, and therefore normally in need of being reported to the converter or the system. Thus, what is needed is simple circuit that covers these fault scenarios in a converter.

SUMMARY OF THE INVENTION

It is an object of the present invention to provide a circuit for detecting input rail floating, high side switch gate floating, and high side switch short or open.

A circuit for detecting faults in at least one converter in a converter system is provided. The at least one converter including a switching stage having high- and low-side switches connected at a switching node and fault circuitry for managing a plurality of fault conditions. The circuit including a gate driver circuit connected to gate terminals of the high- and low-side switches for providing PWM signals to control the switching stage; a comparator circuit for comparing a voltage at the switching node to the input voltage and providing an output signal, the comparator circuit having output, positive and negative terminals; a fourth capacitor connected to the output terminal of the comparator circuit to generate an AC component of the comparator circuit output signal; and a rectifier circuit connected to the fourth capacitor for rectifying the AC component of the comparator circuit and providing a fault-indicating signal to the gate driver. The fault-indicating signal is used to drive the fault circuitry to correct a fault condition selected from the plurality of fault conditions in the converter system.

Other features and advantages of the present invention will become apparent from the following description of the invention that refers to the accompanying drawings.

DETAILED DESCRIPTION OF EMBODIMENTS OF THE INVENTION

Figure 1:
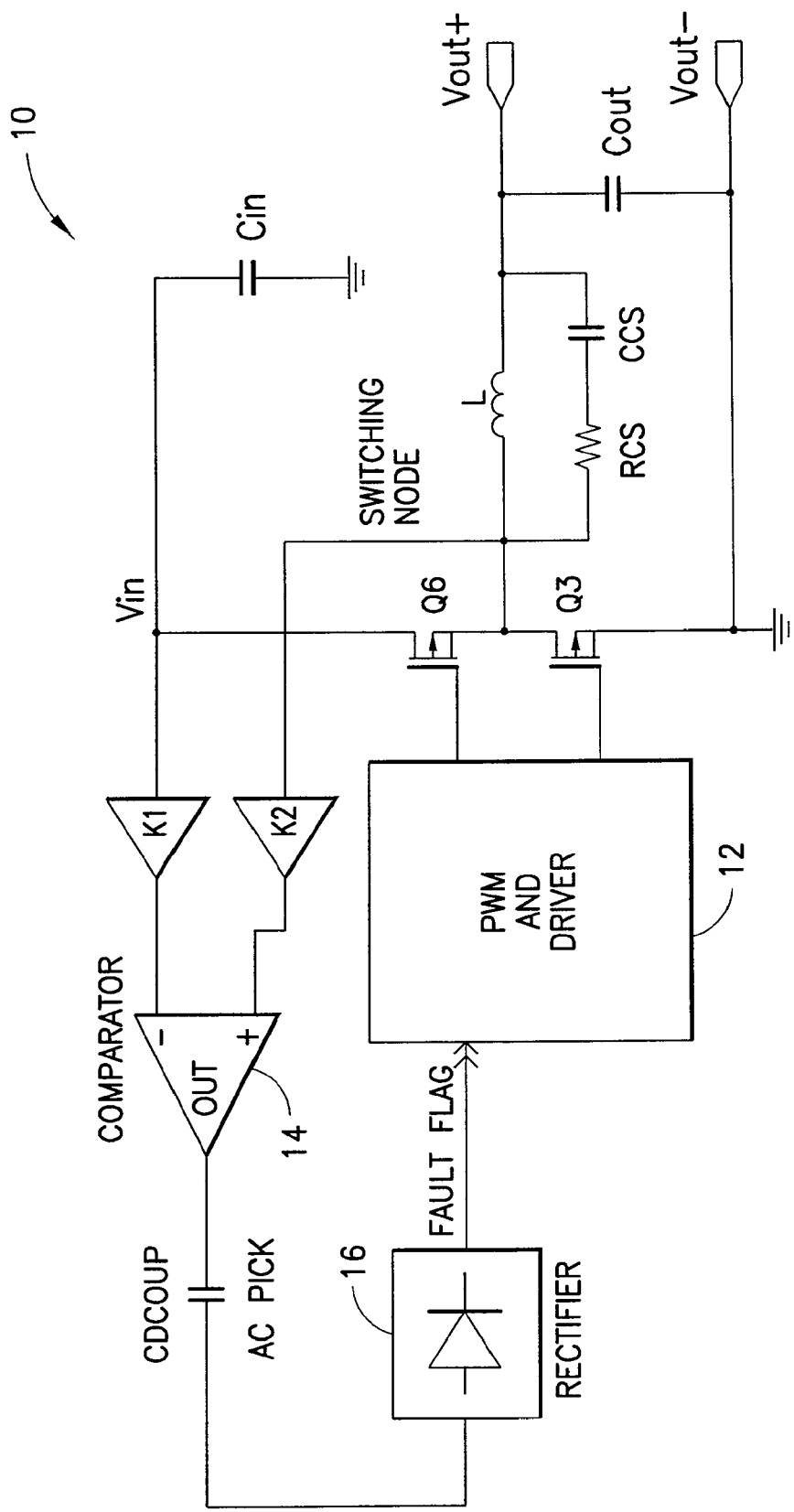
FIG. 1 is a block diagram of a circuit of converter and a fault detector of the present invention.

FIG. 1 illustrates a converter having a PWM enabled gate driver for controlling a switching stage consisting of high- and low-side switches Q6 and Q3 connected at a switching node. A second terminal of the high-side switch is connected to an input voltage source $V_{IN}$, which is connected to a grounded capacitor CIN. A second terminal of the low-side switch is connected to the ground. An inductor L is connected between the switching node and a positive output voltage terminal $V_{OUT+}$, which is coupled by a capacitor COUT to a negative output voltage terminal $V_{OUT-}$. A stage of series couples resistor RCS and capacitor CCS is parallel connected to the inductor L.

The present invention further includes a detection circuit comprised of a comparator 14 for comparing a voltage at the switching node, which may be scaled by a value provided by an amplifier circuit K2 connected to a positive terminal of the comparator 14, to the input voltage Vin, which may be scaled by a value provided by an amplifier circuit K1 connected to a negative terminal of the comparator 14. A capacitor CDCOUP, connected between an output terminal of the comparator 14 and an input of a rectifier 16, provides the AC component of an output signal of the capacitor CDCOUP to be rectified by the rectifier 16. A fault flag signal provided by the rectifier 16 may be used to drive fault-related circuitry of a downstream converter.

The circuit 10 uses the voltage at the switching node for comparison with the input voltage $V_{IN}$ scaled by the amplifier K1, the output of the comparator 14 is decoupled through a first terminal of the capacitor CDCOUP, a second terminal of the capacitor CDCOUP is connected to the rectifier 16. This arrangement extracts the AC component of the output signal from the comparator 14. This AC component may be used to signal a fault condition in the converter 10.

Input rail floating, high-side switch short or open are the most common converter fault scenarios. When the high-side switch Q6 is short or open, the output of the comparator 14 will be constant high or low, respectively. Thereafter no AC component will be fed into the rectifier 16 through the decoupling capacitor CDCOUP.

Figure 2:
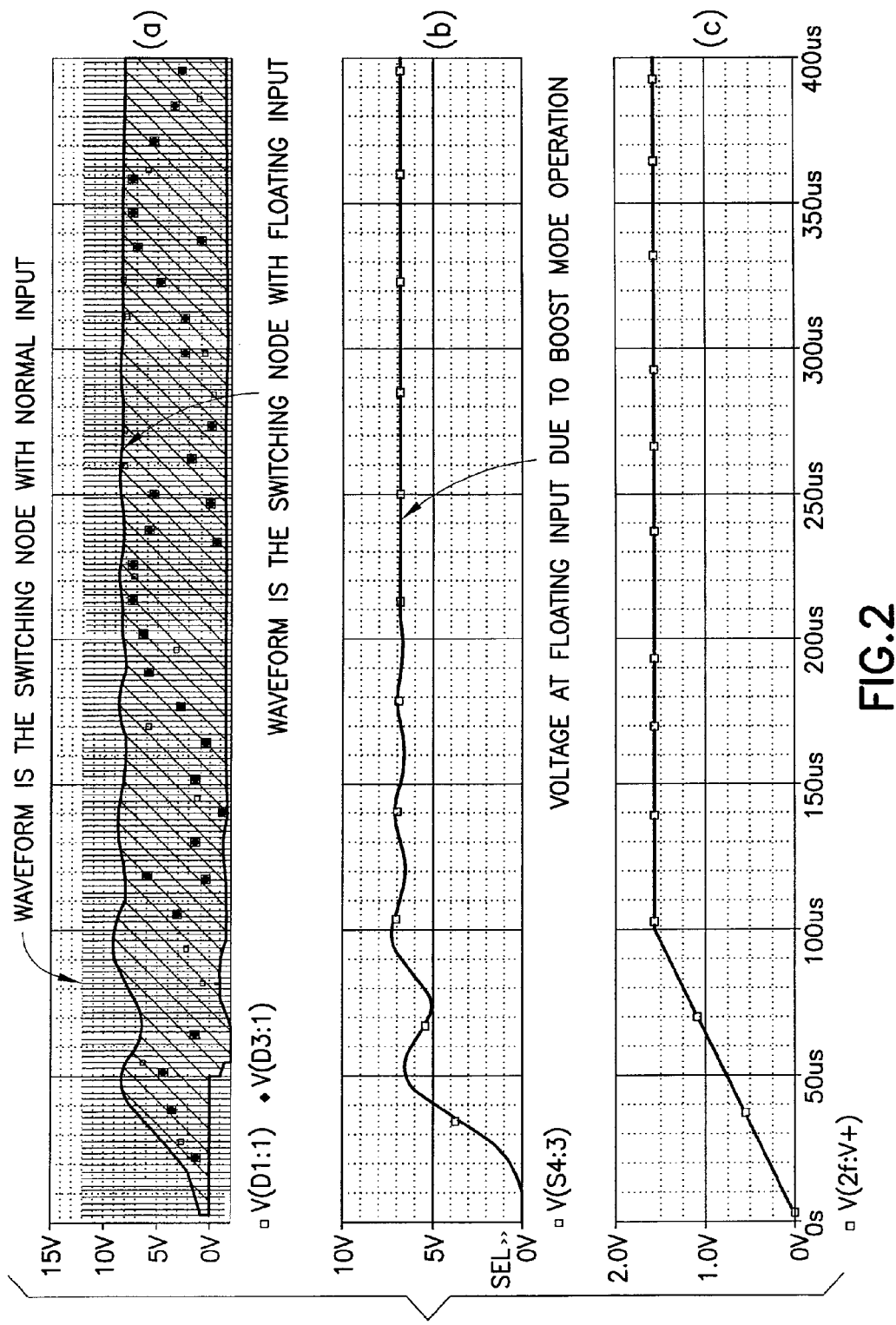
FIG. 2 is a graph illustrating a peak voltage at the switching node during input rail floating.

For input rail floating, illustrated in FIG. 2, in graph (a) a waveform of voltage at the switching node with floating input is displayed over a waveform of voltage at the switching node with normal input. Graph (b) illustrates a waveform of voltage at the switching node with floating input due to boost mode operation of the buck converter of FIG. 1. A peak voltage at the switching node will be less than the input voltage $V_{IN}$. So a preset threshold as in graph (c) can be compared with the voltage at the switching node. This will indicate a fault to the converter.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A circuit for detecting faults in a converter, the converter including a switching stage having high- and low-side series switches connected together at a switching node and fault circuitry for managing a plurality of fault conditions, an input voltage source at an input rail being provided at one terminal of the high-side switch, the circuit comprising:

a gate driver circuit connected to gate terminals of the high- and low-side switches for providing PWM signals to control the switching stage;

a comparator circuit for comparing a voltage at the switching node to an input voltage from the input voltage source and providing an output signal, the comparator circuit having an output terminal, and positive and negative input terminals;

a capacitor connected in series with the output terminal of the comparator circuit to generate an AC component of the comparator circuit output signal; and a rectifier circuit connected in series with the capacitor for rectifying the AC component of the comparator circuit output signal and providing a fault-indicating signal to the gate driver circuit, wherein the fault-indicating signal is used to drive the fault circuitry to detect a fault condition selected from a plurality of fault conditions in the converter, wherein the plurality of fault conditions is selected from at least one of input rail floating, high-side switch gate floating, high-side switch shorted and high-side switch open.

2. The circuit of claim 1, wherein the input voltage source is connected to the one terminal of the high-side switch and further to a grounded capacitor.

3. The circuit of claim 1, further comprising:

positive and negative voltage output terminals interconnected by an output capacitor, the negative voltage output terminal being connected to a second terminal of the low side switch;

an inductor connected between the switching node and the positive output voltage terminal; and a series coupled resistor and capacitor stage, the stage being parallel connected to the inductor.

4. The circuit of claim 3, further comprising a circuit connected between the switching node and the positive terminal of the comparator circuit for scaling the voltage at the switching node by a first value.

5. The circuit of claim 4, further comprising a circuit connected to the negative terminal of the comparator circuit for scaling the input voltage by a second value.

6. The circuit of claim 1, wherein the AC component of the comparator circuit output signal is absent in situations selected from at least one of when the high-side switch is shorted the output signal of the comparator circuit is constantly high and when the high-side switch is open the output signal of the comparator circuit is constantly low.

7. The circuit of claim 1, wherein a preset threshold is compared with the voltage at the switching node to determine input rail floating which exists when a peak voltage at the switching node is less than the input voltage, and wherein the threshold is preset to the peak switching node voltage.

* * * * *